United States Patent [19]
Von Holdt

[11] Patent Number: 4,753,415
[45] Date of Patent: Jun. 28, 1988

[54] SAFETY LIFT LOCK

[76] Inventor: John W. Von Holdt, 6864 Lexington La., Niles, Ill. 60648

[21] Appl. No.: 88,236

[22] Filed: Aug. 24, 1987

[51] Int. Cl.$^4$ .............................................. B29C 39/26
[52] U.S. Cl. ..................................... 249/160; 164/342;
249/161; 249/163; 249/205; 425/192 R;
425/195; 425/595
[58] Field of Search ............... 249/160, 161, 163, 205;
52/122.1, 125.2, 125.6, 125.5, 127.7; 425/595,
192 R, 195; 72/446, 448; 164/342

[56] References Cited

U.S. PATENT DOCUMENTS 4,422,275 12/1983 Baetje ....................................... 52/704
4,487,564 12/1984 Von Holdt ........................... 249/160
4,703,595 11/1987 Zipf et al. ............................ 52/125.2

Primary Examiner—Willard Hoag
Attorney, Agent, or Firm—Charles F. Pigott, Jr.; Garrettson Ellis

[57] ABSTRACT

A mold comprises a pair of openable and closeable mold halves separable along a parting line. By this invention, each mold half defines a recessed outer surface portion which communicates with the recessed portion of the other mold half in the closed position. Each mold half defines a bridge portion which extends over its recessed portion and is positioned adjacent to the parting line. Thus, a lifting hook may pass into the recess defined by the outer surface portion to engage the bridge portion of a separate mold half, or to engage both bridge portions of both mold halves in the closed position.

19 Claims, 1 Drawing Sheet

SAFETY LIFT LOCK

BACKGROUND OF THE INVENTION

Large injection molds may weigh hundreds of pounds. To lift them, a lifting eye is often screwed into a recess defined in the mold. This of course is a rather cumbersome process, and, particularly, it leaves much to be desired when there is a need to lift the two mold halves together while they are in the closed position. Generally in that circumstance, a cable is tied to a lifting eye of each mold, to hold the two molds together as they are lifted by a lifting hook. This, however, is not only cumbersome, but it is potentially dangerous should there be a failure of the cable or the like.

The invention of this application constitutes an improvement on my application Ser. No. 904,618 filed Sept. 8, 1986 and entitled Mold Pin Lock. In this particular embodiment, the modification of the mold to permit lifting is entirely without moving parts, and is constructed to hold the mold parting line of a pair of mold halves closed when lifting, without cables. Additionally, each individual mold halve may be lifted safely and without difficulty, as an alternative to lifting the two mold halves while positioned together in their closed position, with equal ease. The specific design used herein does not significantly weaken the mold, so the modification of this invention has no significant bearing on mold life or fragility. Likewise, the mechanism that permits lifting of molds and mold halves is completely simple, cannot malfunction, and is so simple to use that no written instructions are needed.

DESCRIPTION OF THE INVENTION

In accordance with this invention a mold is provided, typically an injection mold, which comprises a pair of openable and closeable mold halves separable along a parting line. In this invention, each mold half defines a recessed outer surface portion which communicates with the recessed portion of the other mold half in the closed position. Each mold half defines a bridge portion which extends over its recessed portion and is positioned adjacent to the parting line. As a result of this, a lifting hook may pass into the recess defined by the outer surface portion to engage the bridge portion of a separate mold half, or alternatively to engage both bridge portions of both mold halves in the closed position, for lifting thereof.

Preferably, the bridge portions extend outwardly no further than adjacent areas of the mold outer surface, apart from the recessed portions. In other words, it is preferred for the bridge portions to be substantially flush with the outer surface of the mold, although they may also be recessed if desired. Additionally, the bridge portions may define a rounded radius at their hook-contacting portions, or, alternatively, they may have square corners.

The bridge portions are preferably an integral, non-separable part of each mold half. The recess may accordingly be formed by drilling away the material of each mold half, leaving the bridge portions as an integral, original part of each mold half, with a drilled-out space underneath.

The recessed portion may be relatively elongated in a direction transverse to the parting line to receive a hook of the desired size for lifting each mold half, or both of them together. Each bridge portion is of course of sufficient size and shaped to be strong enough to easily lift the mold half with which it is integral without risk of failure. Additionally, each of the bridge portions preferably define a surface that resides on the parting line, as shown in the specific embodiment below. Also, the recessed portion of each mold half is generally open to the parting line to permit a hook entering one of the recessed portions to extend through to the other recessed portion and engage both bridge portions.

DESCRIPTION OF THE DRAWINGS

Referring to the drawings.

DESCRIPTION OF SPECIFIC EMBODIMENTS

Figure 1:
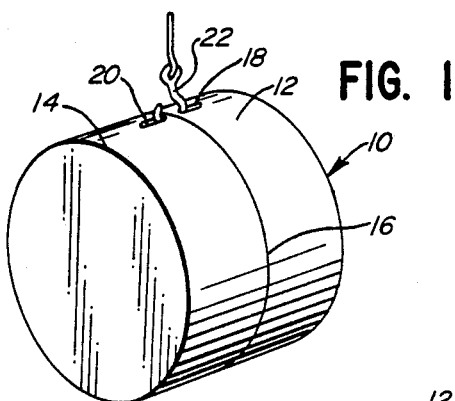
FIG. 1 is a perspective view of a mold which carries a safety lift slot in accordance with this invention.
Figure 2:
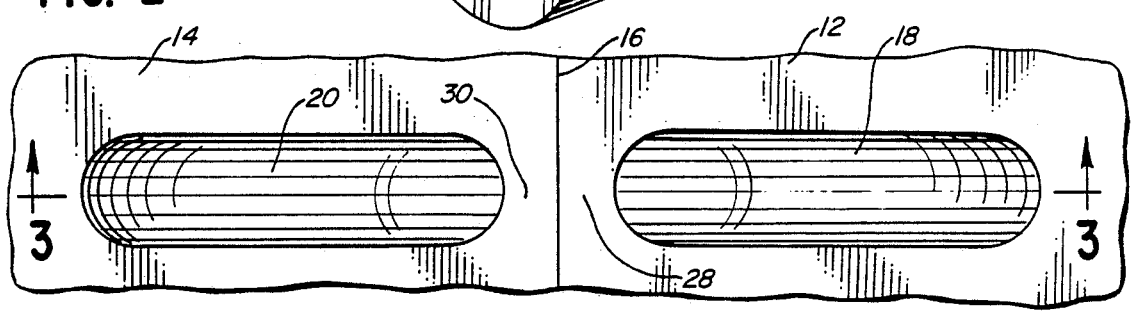
FIG. 2 is an enlarged plan view of a portion of the mold of this invention.

Referring to the drawings, a mold 10 is shown which comprises a pair of openable and closeable mold halves 12, 14, which are separable along a parting line 16. Mold halves 12, 14 may be part of an injection mold system, which system may be entirely conventional except for the modifications described herein.

Figure 3:
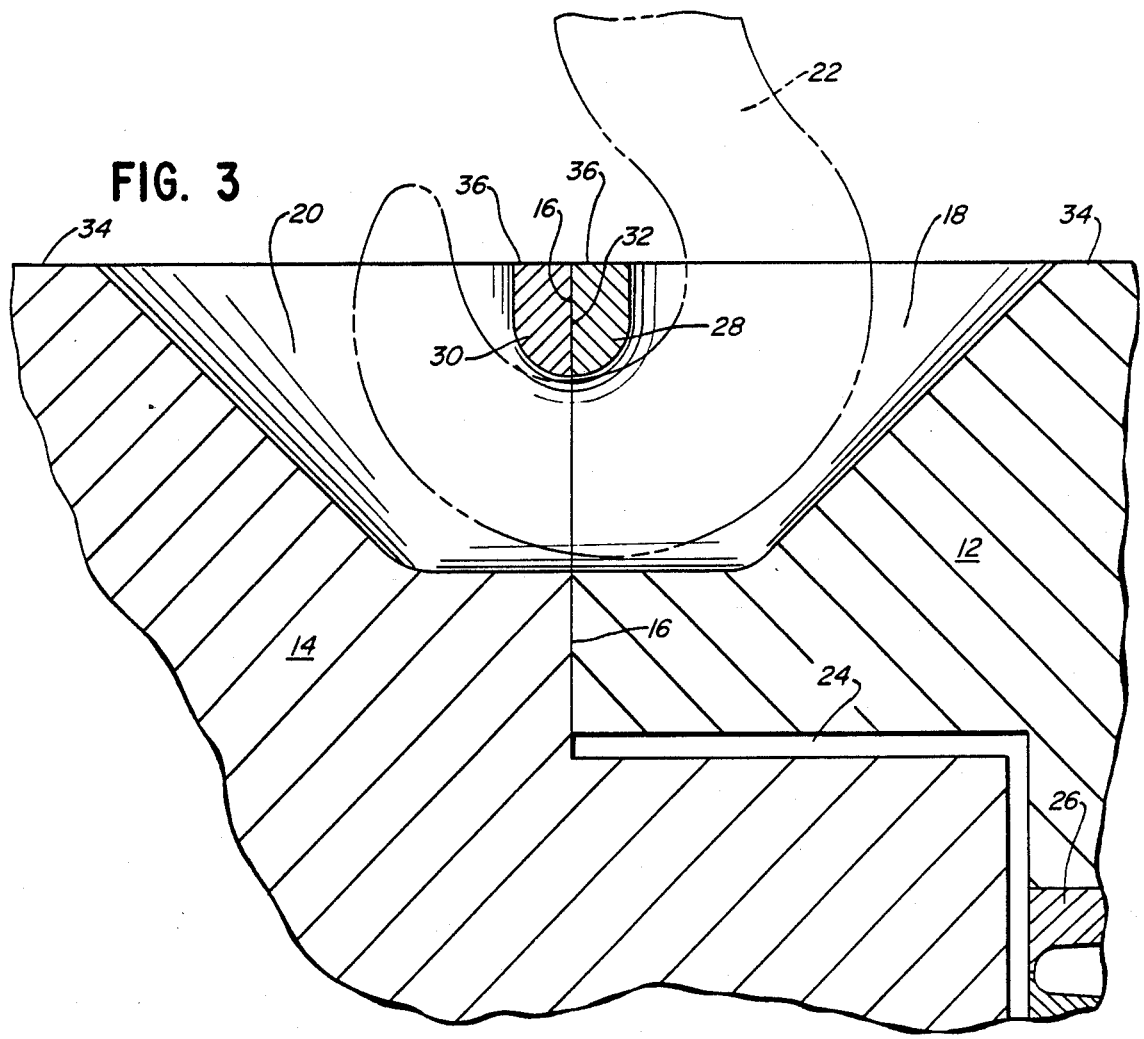
FIG. 3 is a transverse sectional view taken along line 3—3 of FIG. 2.

In accordance with this invention, each mold half defines a recessed outer surface portion 18, 20, each of which portion is shown in FIG. 3 to communicate with the recessed portion of the other mold half in the closed position. By this, it is meant that the recess defined by surface portions 18, 20, is continuous so that a hook 22 may enter the recess defined by one of the portions 18, 20 and may pass through into the recess defined by the other recessed portion 20 or 18.

FIG. 3 shows mold halves 12, 14 in their closed relation to define a molding chamber 24 for the molding of a bucket or the like, with molding chamber 24 being fed molding compound by a conventional sprue 26.

By this invention, each mold half 12, 24 defines a bridge portion 28, 30 which extends over at least a portion of its respective recessed wall portion 18, 20, and is positioned adjacent parting line 16. In the specific embodiment shown, one surface 32 of each of the bridge portions resides precisely at parting line 16, as shown, so that the respective bridge portions 28, 30 meet in engaging relation in the closed position of the mold.

Accordingly, a lifting hook 22 may pass into the recess defined by outer surface portions 18, 20 to engage the respective bridge portions 28, 30 of the mold in its closed position, to lift the entire mold in a safe, simple, and reliable manner. Alternatively, a single mold half 12, 14 may be lifted by the engagement of a hook with its respective bridge portion, for separate lifting of the mold half.

It is preferred for the bridge portions 28, 30 to extend outwardly no further than adjacent areas 34 of the mold outer surface, apart from recessed surface portions 18, 20. In other words, the outer faces 36 of bridge portions 28, 30 should preferably be flush with respect to mold outer surface portions 34. Alternatively, bridge portions 28, 30 may even be recessed with respect to outer surfaces 34, if desired.

It can be seen that bridge portions 28, 30 are integral, non-separable parts of the mold halves, being made of the original blocks of steel from which mold halves 12, 14 are originally made. The recess defined by surfaces 18, 20 may be formed by a routing tool or the like, leaving the bridge portions 28, 30 behind as part of the original steel of the structure. This, of course, provides bridge portions of maximum strength for their cross-sectional size. The cross-sectional size of the bridge portions will of course be selected so that they are entirely capable in all circumstances of holding at least the weight of the load imposed upon them by lifting of the mold. The construction of this invention is relatively easy to manufacture, when compared with other designs of structures, to facilitate lifting of the mold.

It can be seen that the respective recessed surfaces 18, 20 define a recess that is relatively elongated in a direction transverse to parting line 16. This facilitates the proper orientation of a hook 22 as it is inserted into the mold for lifting.

Accordingly, it can be seen that molds modified in accordance with this invention are very easily and safely lifted. When two mold halves are in the closed position as shown in FIG. 3, they may be lifted with assurance that they will not open to a significant degree during the lifting process. Additionally, the separate mold halves are also readily liftable by the same hook 22, with improvements in safety and simplicity of operation.

The above has been offered for illustrative purposes only, and is not intended to limit the scope of the invention of this application, which is as defined in the claims below.

That which is claimed is:

1. In a mold which comprises a pair of operable and closeable mold halves separable along a parting line, the improvement comprising, in combination:
    each mold half defining a recessed outer surface portion which communicates with the recessed portion of the other mold half in the closed position, and each mold half defining a bridge portion which extends over its recessed portion and is positioned adjacent to the parting line, whereby a lifting hook may pass into the recess defined by said outer surface portions to engage said bridge portion of a separate mold half, or to engage both bridge portions of both mold halves in the closed position.

2. The mold of claim 1 in which said bridge portions extend outwardly no farther then adjacent areas of the mold outer surface, apart from said recessed portions.

3. The mold of claim 1 in which said bridge portions are integral, non-separable parts of said mold halves.

4. The mold of claim 1 in which said recessed portion is relatively elongated in a direction transverse to said parting line.

5. The mold of claim 1 in which said bridge portions each define a surface that resides on said parting line.

6. The mold of claim 1 in which the recessed portion of each mold half is open to the parting line.

7. In a mold which comprises a pair of openable and closeable mold halves separable along a parting line, the improvement comprising, in combination:
    each mold half defining a recessed outer surface portion which communicates with the recessed portion of the other mold half in the closed position, and each mold half defining a bridge portion which extends over its recessed portion and is positioned adjacent to the parting line, said bridge portions being each integral, non-separable parts of said mold halves, said bridge portions extending outwardly no farther than adjacent areas of said mold outer surface, apart from said recessed portions, whereby a lifting hook may pass into the recess defined by said outer surface portions to engage said bridge portion of a separate mold half, or to engage both bridge portions of both mold halves in the closed position.

8. The mold of claim 7 in which said recessed portion is relatively elongated in a direction transverse to said parting line.

9. The mold of claim 8 in which said bridge portions each define a surface that resides on said parting line.

10. The mold of claim 9 in which the recessed portion of each mold half is open to the parting line.

11. In a mold half for joining with another mold half along a parting line to define a molding chamber in which objects are molded, the improvement comprising, in combination:
    said mold half having a parting line-defining surface, and a recess defined in the outer surface of said mold half other than said parting line-defining surface, said recess being open through said parting line-defining surface, said mold half also having a bridge portion extending over said recess and positioned adjacent to said parting line-defining surface, whereby a lifting hook may pass into said recess to engage said bridge portion for lifting.

12. The mold half of claim 11 in which the bridge portion extends outwardly no farther then adjacent areas of the mold outer surface, apart from said recessed portions.

13. The mold half of claim 11 in which said bridge portions are integral, non-separable parts of said mold halves.

14. The mold half of claim 11 in which said recessed portion is relatively elongated in a direction transverse to said parting line.

15. The mold half of claim 11 in which said bridge portions each define a surface that resides on said parting line.

16. In a mold half for joining with another mold half along a parting line to define a molding chamber in which objects are molded, the improvement comprising, in combination:
    said mold half having a parting line-defining surface, and a recess defined in the outer surface of said mold half other than said parting line-defining surface, said recess being open through said parting line-defining surface, said mold half also having a bridge portion extending over said recess and defining a surface that is part of said parting line-defining surface, said bridge portion extending outwardly no farther than adjacent areas of the mold outer surface, apart from said recessed portions, whereby a lifting hook may pass into said recess to engage said bridge portion for lifting.

17. The mold half of claim 16 in which the bridge portion extends outwardly no farther than adjacent areas of the mold outer surface, apart from said recessed portions.

18. The mold half of claim 17 in which said bridge portions are integral, non-separable parts of said mold halves.

19. The mold half of claim 18 in which said recessed portion is relatively elongated in a direction transverse to said parting line.

* * * * *